United States Patent
Kokubo

(10) Patent No.: US 11,577,398 B2
(45) Date of Patent: Feb. 14, 2023

(54) ROBOT, MEASUREMENT FIXTURE, AND TOOL-TIP-POSITION DETERMINING METHOD

(71) Applicant: FANUC CORPORATION, Yamanashi (JP)

(72) Inventor: Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 16/999,414

(22) Filed: Aug. 21, 2020

(65) Prior Publication Data
US 2021/0107160 A1    Apr. 15, 2021

(30) Foreign Application Priority Data
Oct. 9, 2019    (JP) .............................. JP2019-185834

(51) Int. Cl.
  *B25J 19/00*    (2006.01)
  *B25J 9/16*    (2006.01)
  (Continued)

(52) U.S. Cl.
  CPC .......... *B25J 9/1692* (2013.01); *B25J 9/1697* (2013.01); *B25J 15/0019* (2013.01); *B25J 19/00* (2013.01); *G01B 11/005* (2013.01)

(58) Field of Classification Search
  CPC .... B25J 9/1692; B25J 15/0019; B25J 9/1697; B25J 19/00; G01B 11/005; G01B 11/002;
  (Continued)

(56) References Cited

U.S. PATENT DOCUMENTS

| 11,369,443 | B2* | 6/2022 | Shelton, IV ....... A61B 17/3421 |
| 2002/0038855 | A1 | 4/2002 | Hwang |

(Continued)

FOREIGN PATENT DOCUMENTS

| EP | 1584426 A1 | 10/2005 |
| JP | H11-085427 A | 3/1999 |

(Continued)

OTHER PUBLICATIONS

Birk, A Computation for Robots to Orient and Position Hand-Held Workpieces, 1976, IEEE, p. 665-671 (Year: 1976).*

(Continued)

*Primary Examiner* — McDieunel Marc
(74) *Attorney, Agent, or Firm* — Maier & Maier, PLLC

(57) ABSTRACT

A robot including an arm, a tool attached to the arm, a measurement fixture to be attached to a tip portion of the tool detachably, and a controller that recognizes a reference coordinate system used to control the arm, and that controls the arm. The controller stores data indicating a positional relationship between a tip of the tool and the measurement fixture or data to be used to calculate the positional relationship, and the controller calculates positional coordinates of the tip of the tool in the reference coordinate system based on position data of the measurement fixture and the positional relationship, where the position data is detected by using acquired image data from a visual sensor whose position is associated with the reference coordinate system.

9 Claims, 8 Drawing Sheets

(51) Int. Cl.
 *B25J 15/00* (2006.01)
 *G01B 11/00* (2006.01)

(58) Field of Classification Search
 CPC .......... G05B 2219/39008; G05B 2219/40611; G05B 19/4086; G05B 2219/39045; G05B 2219/39022; H04N 13/20; H04N 7/181; G06T 7/73; G06T 7/85; G06T 7/12; G06T 7/80; G06T 2207/30244; G06T 2207/10012; G06T 2207/30004; G06T 2207/30208; A61B 34/30
 See application file for complete search history.

(56) References Cited

U.S. PATENT DOCUMENTS

2005/0225278 A1 10/2005 Ban et al.
2017/0016712 A1 1/2017 Suzuki

FOREIGN PATENT DOCUMENTS

| JP | 2002-103259 A | 4/2002 |
| JP | 2005-300230 A | 10/2005 |
| JP | 2006-181591 A | 7/2006 |
| JP | 4191080 B | 12/2008 |
| JP | 2011-011321 A | 1/2011 |
| JP | 2017-019072 A | 1/2017 |

OTHER PUBLICATIONS

Beasley et al., Increasing Accuracy in Image-Guided Robotic Surgery Through Tip Tracking and Model-Based Flexion Correction, 2009, IEEE, p. 292-302 (Year: 2009).*
Wang et al., Positioning control system based on computer vision, 2016, IEEE, p. 108-111 (Year: 2016).*
Stolka et al., Improving Navigation Precision of Milling Operations in Surgical Robotics, 2006, IEEE, p. 2351-2357 (Year: 2006).*
Mack, Minimally Invasive and Robotic Surgery, 2001, IEEE, p. 568-572 (Year: 2001).*

* cited by examiner

FIG. 2
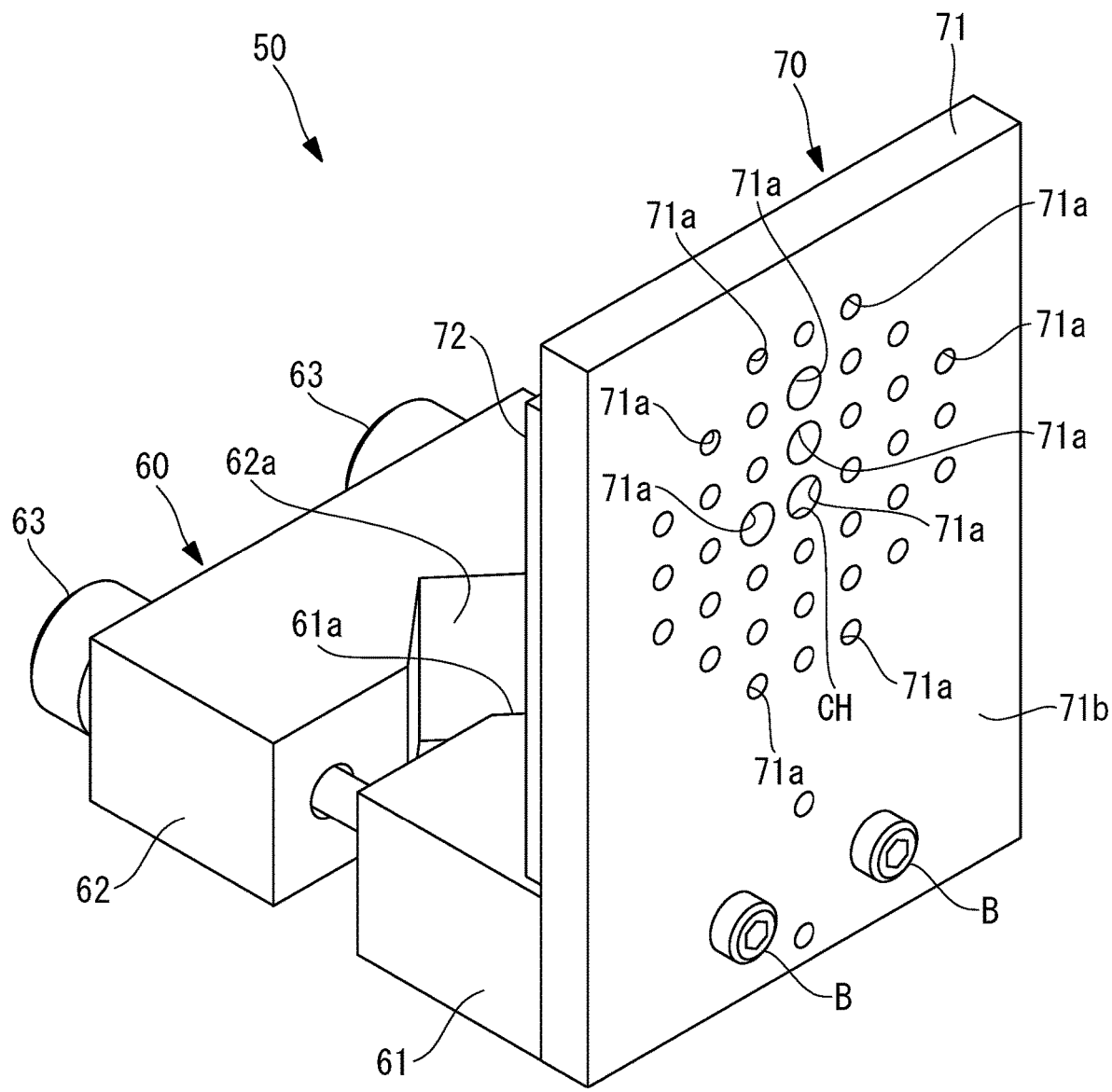
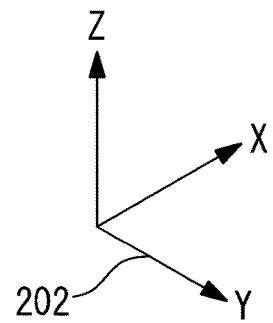

ROBOT, MEASUREMENT FIXTURE, AND TOOL-TIP-POSITION DETERMINING METHOD

CROSS-REFERENCE TO RELATED APPLICATIONS

This application is based on and claims priority to Japanese Patent Application No. 2019-185834 filed on Oct. 9, 2019, the content of which is incorporated herein by reference in its entirety.

FIELD

The present invention relates to a robot, a measurement fixture, and a tool-tip-position determining method.

BACKGROUND

In the related art, there is a known technology in which a visual sensor having a line of sight in a vertical direction is employed to perform: a step of disposing a tip of a tool at the center of a viewing field of the visual sensor by means of a robot; a step of moving the center of the tool in a translating manner in the vertical direction by means of the robot; and a step of variously changing the orientation of the robot supporting the tool in that state, thus determining the position of the tip of the tool. For example, see Publication of Japanese Patent No. 4191080.

In addition, there is a known technology in which a reflector is attached to a tool of a robot, and the position of the reflector is detected by means of a laser tracker. For example, see Japanese Unexamined Patent Application, Publication No. 2006-181591.

SUMMARY

A first aspect of the present disclosure is a robot including, an arm, a tool attached to the arm, a measurement fixture to be attached to a tip portion of the tool detachably, and a controller that recognizes a reference coordinate system used to control the arm, and that controls the arm, wherein the controller stores data indicating a positional relationship between a tip of the tool and the measurement fixture or data to be used to calculate the positional relationship, and the controller calculates positional coordinates of the tip of the tool in the reference coordinate system based on position data of the measurement fixture and the positional relationship, wherein the position data is detected by using acquired image data from a visual sensor whose position is associated with the reference coordinate system.

A second aspect of the present disclosure is a measurement fixture to be attached to a tip portion of a tool for a robot, the measurement fixture including, a gripping portion that grips an outer circumference surface of the tip portion extending in a prescribed direction, and an extension portion that extends in the prescribed direction from the gripping portion, wherein a groove that extends in the prescribed direction and in which the outer circumference surface of the tip portion fits is formed in the gripping portion, and a plurality of holes or marks, which are to be imaged by a visual sensor, are formed in the extension portion.

A third aspect of the present disclosure is a tool-tip-position determining method including, attaching a measurement fixture to a tip portion of a tool attached to an arm of a robot, acquiring an image of the measurement fixture by means of a visual sensor whose positions is associated with a reference coordinate system used to control the arm storing, in a controller that controls the arm, data indicating a positional relationship between a tip of the tool and the measurement fixture or data to be used to calculate the positional relationship, and calculating, by means of the controller, positional coordinates of the tip of the tool in the reference coordinate system based on position data of the measurement fixture and the positional relationship, the position data being detected by using acquired image data from the visual sensor.

BRIEF DESCRIPTION OF DRAWINGS

FIG. 2 is a perspective view of a measurement fixture of this embodiment.

DETAILED DESCRIPTION

A robot 1 according to an embodiment of the present invention will be described below with reference to the drawings.

Figure 1:
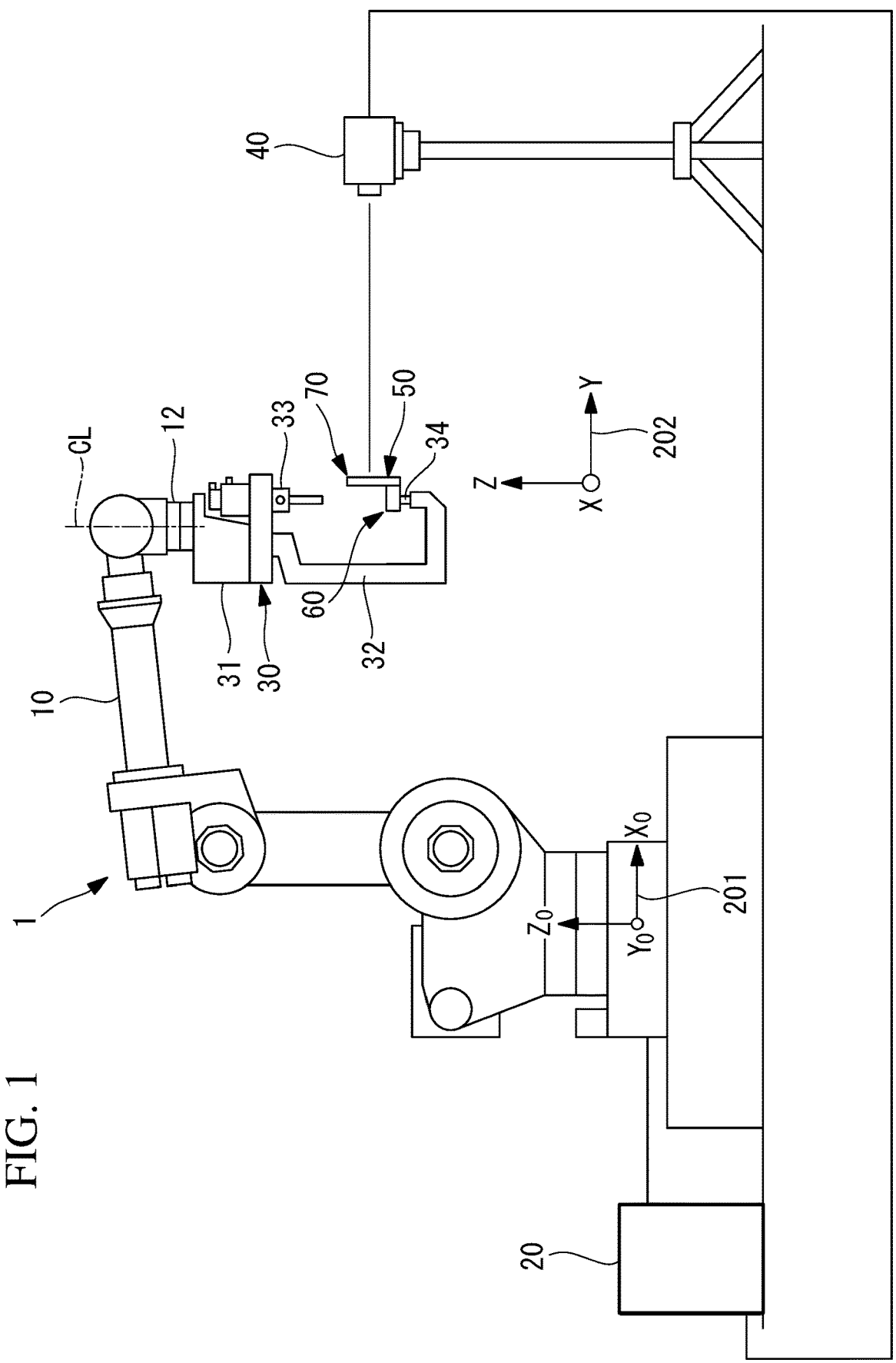
FIG. 1 is a schematic configuration diagram of a robot according to an embodiment of the present invention.

As shown in FIG. 1, the robot 1 of this embodiment includes an arm 10 and a controller 20 that controls the arm 10. In addition, this robot 1 has a spot-welding tool 30 that is attached to a wrist flange 12, which is a tip portion of the arm 10, and performs spot welding by using the tool 30.

The arm 10 of the robot 1 includes a plurality of arm members and a plurality of joints. In addition, the arm 10 includes a plurality of servomotors 11 that individually drive the plurality of joints (see FIG. 5). As the individual servomotors 11, various types of servomotors such as rotary motors and linear motors could be employed. The individual servomotors 11 have operating-position detection devices for detecting operating positions and operating speeds thereof, and an encoder is an example of the operating-position detection device. Detection values from the operating-position detection devices are transmitted to the controller 20.

Figure 5:
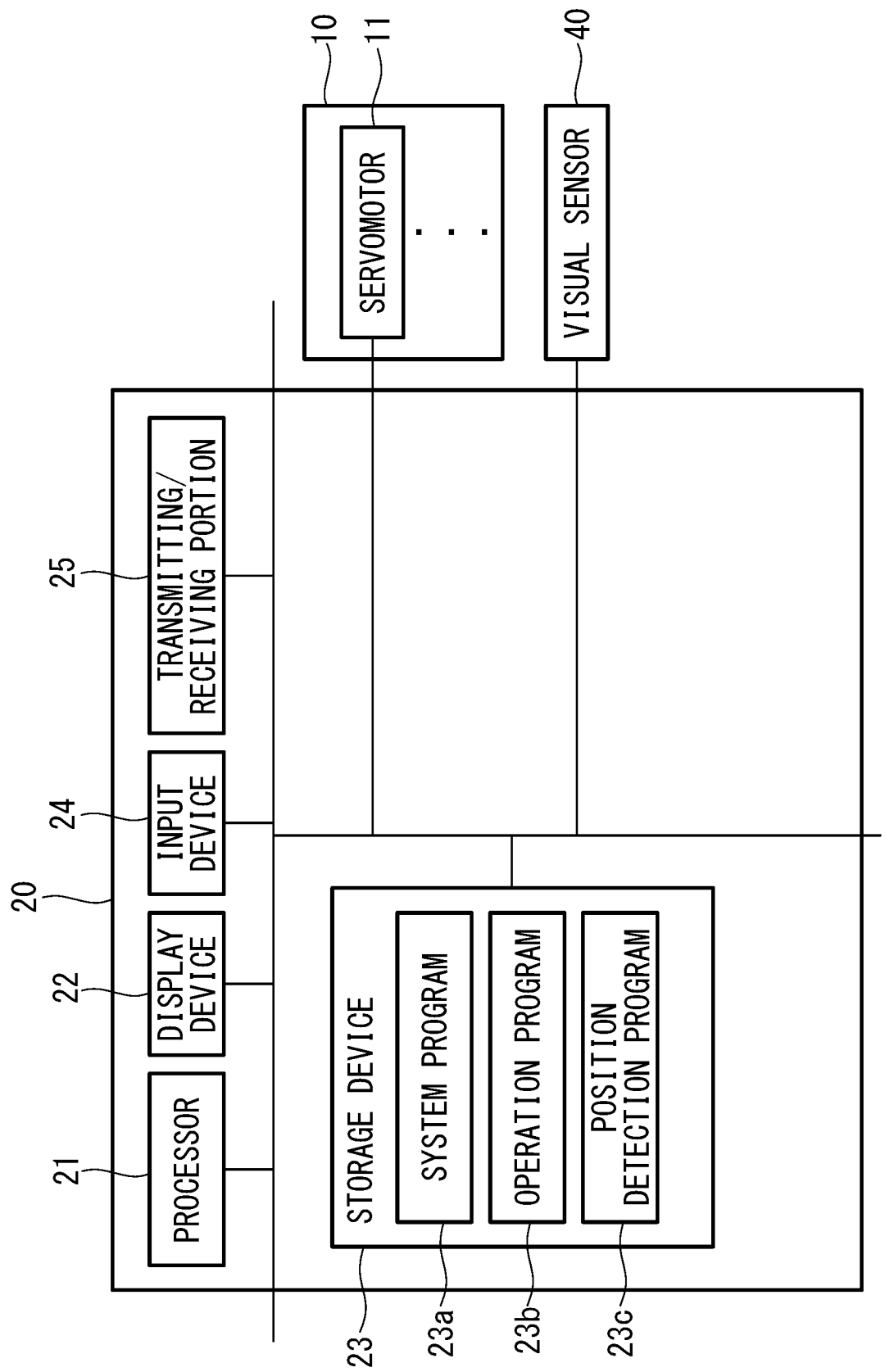
FIG. 5 is a block diagram of a controller of the robot of this embodiment.

As shown in FIG. 5, the controller 20 includes: a processor 21 such as a CPU; a display device 22; a storage device 23 that has a nonvolatile storage, a ROM, a RAM, etc.; an input device 24 such as a keyboard, a touch screen or an operating panel; and a transmitting/receiving portion 25 for transmitting/receiving signals. The input device 24 and the transmitting/receiving portion 25 function as input units. The controller 20 is connected to a visual sensor 40, described later, and the individual servomotors 11.

In this embodiment, the controller 20 is a robot controller provided in the robot 1; however, the controller 20 may be a computer that is provided outside the robot 1 and that has the above-described configuration.

The storage device 23 stores a system program 23*a*, and the system program 23*a* provides basic functions of the controller 20. The storage device 23 also stores an operation program 23b. The operation program 23b is created by making reference to a reference coordinate system of the robot 1 and is for sequentially disposing the tool 30 attached to the tip portion of the arm 10 at a plurality of prescribed welding positions in the reference coordinate system. The storage device 23 also stores a position detection program 23c.

The tool 30 of this embodiment has: a body portion 31 secured to the wrist flange 12; a tool arm 32 secured to the body portion 31; a movable electrode unit 33 supported at a base portion of the body portion 31 or the tool arm 32; and a stationary electrode unit 34 supported at a tip portion of the tool arm 32. An electrode of the movable electrode unit 33 can be moved toward the stationary electrode unit 34. The stationary electrode unit 34 has an electrode that faces the electrode of the movable electrode unit 33.

The robot 1 of this embodiment is provided with the visual sensor 40. The visual sensor 40 may be provided separately from the robot 1. The visual sensor 40 is a two-dimensional camera, a three-dimensional camera, or the like. In this embodiment, the visual sensor 40 is a two-dimensional camera.

The robot 1 has a measurement fixture 50, and the measurement fixture 50 is attached to the tip portion of the tool 30 detachably, as shown in FIG. 1. The tip portion of the tool 30 in this embodiment is the stationary electrode unit 34, and the measurement fixture 50 is attached to the stationary electrode unit 34.

In this embodiment, a direction in which the stationary electrode unit 34 extends is referred to as the Z-direction (prescribed direction). In addition, in this embodiment, although the Z-direction of a fixture coordinate system 202 is aligned or substantially aligned with a direction in which a center axis CL of the wrist flange 12 extends, there is no limitation thereto.

As shown in FIGS. 1-4, the measurement fixture 50 has a gripping portion 60, which grips the stationary electrode unit 34, and an extension portion 70 that extends in the Z-direction of the fixture coordinate system 202 from the gripping portion 60.

Figure 3:
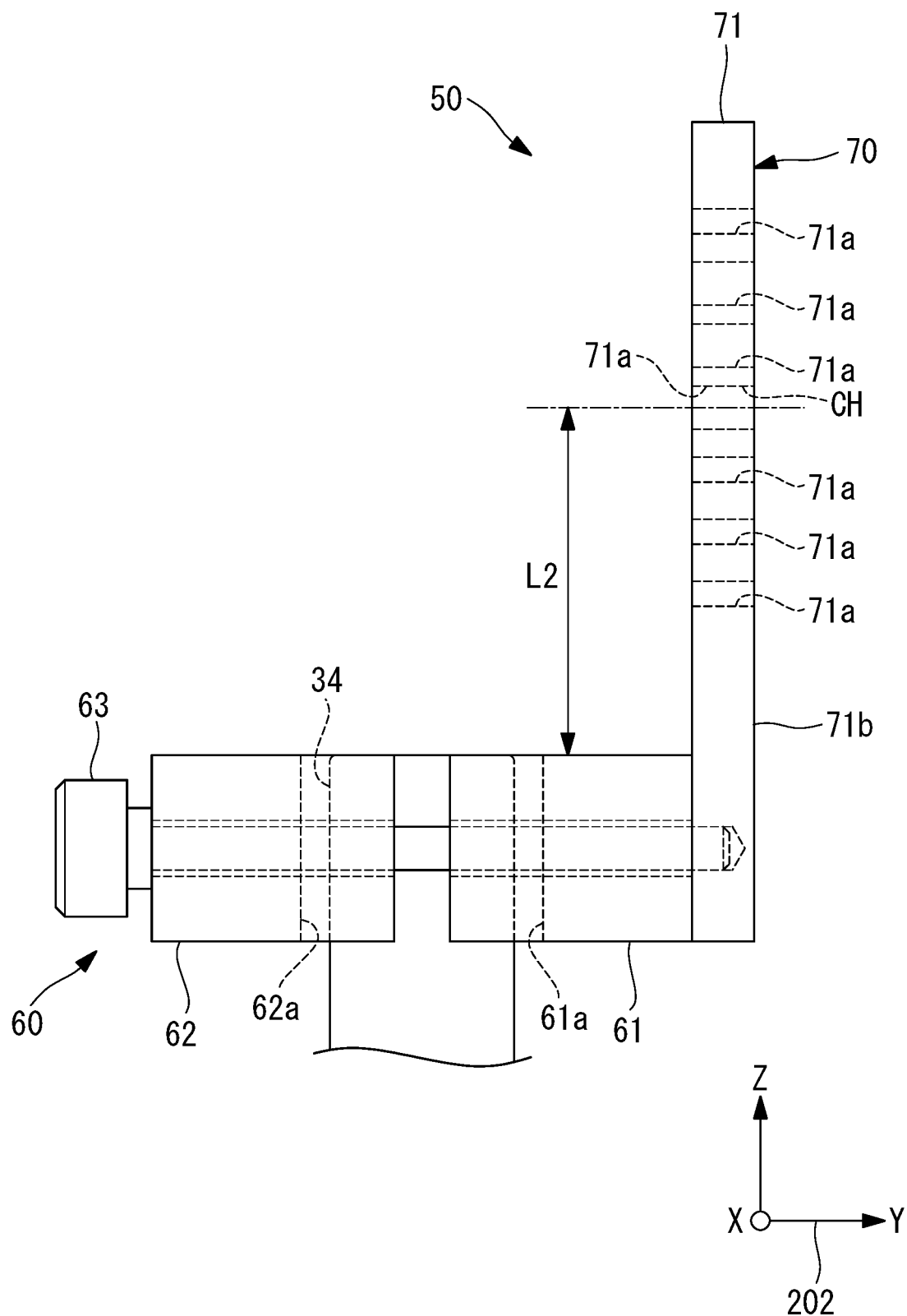
FIG. 3 is a side view of the measurement fixture of this embodiment.

As shown in FIGS. 2 and 3, the gripping portion 60 has: a first gripping member 61; and a second gripping member 62 facing the first gripping member 61 in a Y-direction of the fixture coordinate system 202. The Y-direction is orthogonal to the Z-direction. A groove 61a is formed on a surface of a second gripping member 62 side in the first gripping member 61, and the groove 61a extends in the Z-direction. In addition, a groove 62a is formed on a surface of a first gripping member 61 side in the second gripping member 62, and the groove 62a extends in the Z-direction.

The second gripping member 62 is coupled with the first gripping member 61 by means of a plurality of bolts 63, and, as a result of tightening the plurality of bolts 63 into the first gripping member 61, the second gripping member 62 moves toward the first gripping member 61. In other words, as a result of tightening the plurality of bolts 63 into the first gripping member 61 after disposing the stationary electrode unit 34 between the first gripping member 61 and the second gripping member 62, the stationary electrode unit 34 is gripped by the first gripping member 61 and the second gripping member 62. At this time, an outer circumference surface of the stationary electrode unit 34 fits into the grooves 61a and 62a. Accordingly, the direction in which the stationary electrode unit 34 extends aligns with the direction in which the grooves 61a and 62a extend. Note that slip-proofing such as knurling may be applied to outer circumference surfaces of head portions of the bolts 63. In this case, an operator may perform the tightening by holding the heads of the bolts 63.

In this embodiment, the extension portion 70 is made of a plate member 71 that extends in the X-direction and the Z-direction of the fixture coordinate system 202 and is secured to the first gripping member 61 by means of bolts B. A plurality of holes 71a are formed in the plate member 71, and some of the holes 71a are larger than other holes. The individual holes 71a pass through the plate member 71. Some of the large holes 71a are arrayed in the Z-direction, and the other large holes 71a are arrayed in the X-direction. One of the large holes 71a serves as a center hole CH disposed at a center of the group of holes 71a. The small holes 71a are also arrayed in the Z-direction and the X-direction. In this embodiment, the plurality of holes 71a are disposed at an equal pitch, and the controller 20 recognizes the positional relationship by design or the actual positional relationship of the holes 71a.

In this embodiment, in the state in which Z-direction positions of a tip surface of the stationary electrode unit 34 and a Z-direction end surface of the first gripping member 61 are aligned, the stationary electrode unit 34 is gripped by the first gripping member 61 and the second gripping member 62.

An anti-reflection member 72, that is, a plate or the like to which a black fabric or black electroless nickel plating is applied, is attached to a surface of a first gripping member 61 side in the plate member 71, and openings of the individual holes 71a on the first gripping member 61 side are closed with the anti-reflection member 72. The surface to which the anti-reflection member 72 is not attached in the plate member 71 serves as a measurement surface 71b.

Figure 6:
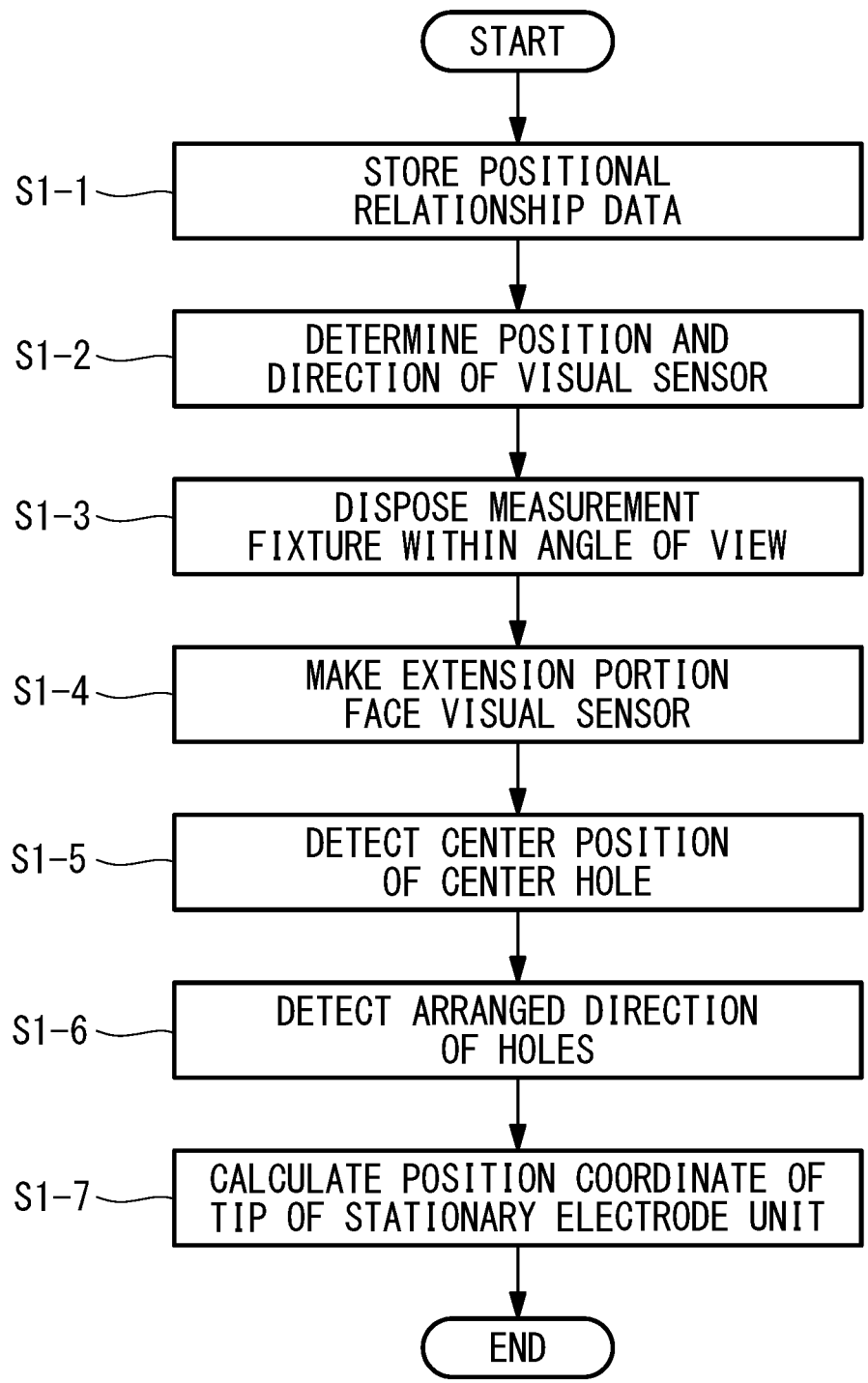
FIG. 6 is a flowchart showing an example of processing performed by the controller of the robot of this embodiment.

The controller 20 performs, for example, the following processing based on the position detection program 23c (FIG. 6). Note that the visual sensor 40 is installed at an arbitrary position in the surrounding area of the robot 1, and is in a state in which the measurement fixture 50 at the tip of the arm 10 is in a viewing field of the visual sensor 40.

Figure 4:
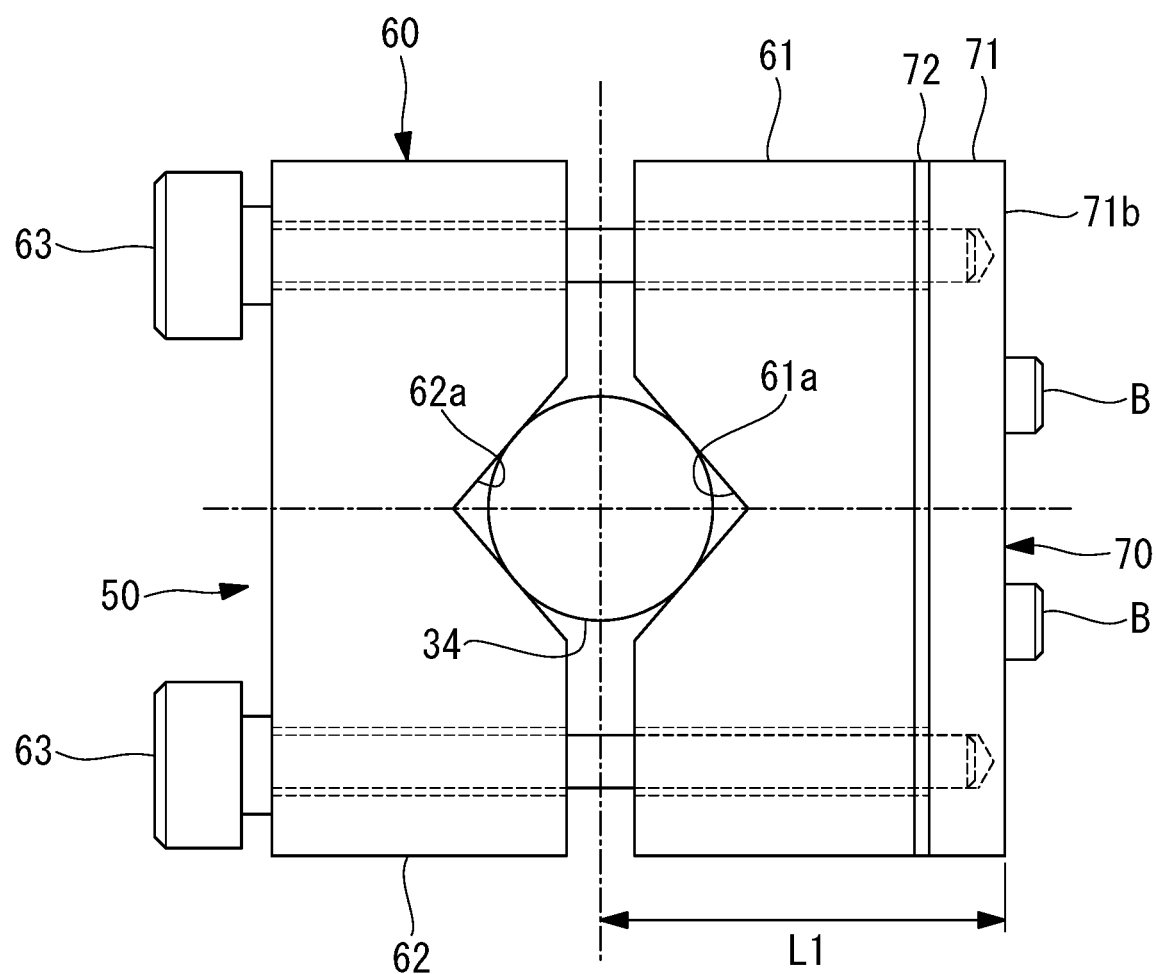
FIG. 4 is a plan view of the measurement fixture of this embodiment.

The operator first inputs data indicating the positional relationship between a center position of the opening of the center hole CH in the measurement surface 71b of the measurement fixture 50 and the tip of the stationary electrode unit 34 by using the input device 24 or the like. For example, as shown in FIGS. 3 and 4, in the measurement fixture 50, a Z-direction distance L2 from a Z-direction surface of the first gripping member 61 to the center of the center hole CH is known. In addition, the shape of the groove 61a of the first gripping member 61 is also known, and the diameter of the stationary electrode unit 34 having a cylindrical shape is also known. Accordingly, a distance L1 from a center axis of the stationary electrode unit 34 to the measurement surface 71b is also known. The operator inputs, for example, the distances L1 and L2 by using the input device 24 or the like.

The operator may input data to be used to calculate the positional relationship by using the input device 24 or the like. For example, the operator inputs CAD data about the measurement fixture 50 and the stationary electrode unit 34.

The controller 20 stores the positional relationship data input to the input device 24 in the storage device 23 (step S1-1).

In this state, the controller 20 causes the tip portion of the arm 10 or the measurement fixture 50 to be disposed at a plurality of prescribed positions while recognizing the position of the tip portion of the arm 10 or the measurement fixture 50 by using acquired image data being sequentially transmitted thereto from the visual sensor 40, and determines the position and the direction of the visual sensor 40 in a reference coordinate system 201 by doing so (step S1-2). Note that a reference coordinate system set with respect to the tip portion of the arm 10 may be employed instead of the reference coordinate system 201.

Image processing is appropriately applied to the acquired image data. In step S1-2, the position and the direction of the visual sensor 40 are associated with the reference coordinate system 201.

Step S1-2 is performed by means of a well-known calibration program or the like. For example, the controller 20 causes a portion of the tip portion of the arm 10 to be disposed at a first position at which said portion faces the visual sensor 40. The controller 20 recognizes the position and the orientation of this portion in the reference coordinate system 201 by using the settings set at the time of shipping of the robot. The controller 20 causes the portion to be variously rotated about the X-axis, the Y-axis, and the Z-axis in order to make the portion accurately face the visual sensor 40, and detects the shape or the like of the portion at that time.

In addition, the controller 20 causes the portion to be moved to a second position from the first position, and detects the shape, the size, or the like of the measurement fixture 50 at that time. For example, when the distance between the portion and the visual sensor 40 is changed in the state in which the portion is accurately facing the visual sensor 40, the size of the portion in the acquired image data changes. In addition, when the distance is changed so that a center position of the portion in the angle of view does not change, the direction of the line of sight of the visual sensor 40 is identified. Here, the controller 20 recognizes the amount, the direction, and so forth of movements of the portion caused by the arm 10 based on the detection values of the operating-position detection devices of the individual servomotors. With such motions, the controller 20 can determine the position and the direction of the visual sensor 40. Note that the controller 20 can also similarly determine the position and the direction of the visual sensor 40 by using the measurement fixture 50 instead of the portion of the tip portion of the arm 10. When performing step S1-2, the controller 20 can also recognize distortion in a lens of the visual sensor 40 by using the plurality of small holes 71a.

Next, the controller 20 places the extension portion 70 of the measurement fixture 50 in the angle of view of the visual sensor 40 (step S1-3). For example, the center hole CH of the extension portion 70 is disposed at the center of the angle of view of the visual sensor 40, and the entire extension portion 70 is disposed in the angle of view of the visual sensor 40.

In this state, the controller 20 variously changes the orientation of the extension portion 70 while sequentially detecting the shape of the extension portion 70, the shape of the center hole CH, the pitches of the holes 71a, and so forth by using the acquired image data, and thus, the controller 20 causes the extension portion 70 to face the visual sensor 40 (step S1-4).

In this state, the controller 20 detects, by using the acquired image data, the center position of the center hole CH of the extension portion 70 in the reference coordinate system 201 (step S1-5). In addition, the controller 20 detects, by using the acquired image data, a direction of alignment of the holes 71a, which are arrayed in the Z-direction, in the reference coordinate system 201, and detects a direction of alignment of the holes 71a, which are arrayed in the X-direction, in the reference coordinate system 201 (step S1-6).

By doing so, the controller 20 can recognize the respective directions of the fixture coordinate system 202 in the reference coordinate system 201. In addition, the direction in which the groove 61a of the first gripping member 61 of the measurement fixture 50 extends is the Z-direction of the fixture coordinate system 202, and the outer circumference surface of the stationary electrode unit 34 fits into the groove 61a. Accordingly, in step S1-6, the controller 20 also recognizes the extension direction of the stationary electrode unit 34 in the reference coordinate system 201.

Next, the controller 20 calculates positional coordinates of the tip of the stationary electrode unit 34 in the reference coordinate system 201 based on the positional relationship data saved in step S1-1 and the detection result of the center position of the center hole CH in the reference coordinate system 201 detected in step S1-5 (step S1-7). The controller 20 recognizes, in the reference coordinate system 201, the direction of each of the distance L1 and the distance L2 in the fixture coordinate system 202. Accordingly, the controller 20 can move the coordinates of the center position of the center hole CH in a manner corresponding to the distance L1 and the distance L2, and can calculate the positional coordinates of the tip of the stationary electrode unit 34 in the reference coordinate system 201. The coordinate position may be calculated by using the CAD data about the measurement fixture 50 and the stationary electrode unit 34.

As has been described above, the position measurement system of the tip portion of the tool is configured by employing the visual sensor 40, the controller 20, and the measurement fixture 50.

In this embodiment, the measurement fixture 50 is attached to the tip portion of the tool 30 detachably, and the controller 20 stores the data indicating the positional relationship between the tip of the tool 30 and the measurement fixture 50 or the data to be used to calculate the positional relationship. In addition, the position of the measurement fixture 50 is detected by using the acquired image data from the visual sensor 40 that is associated with the reference coordinate system 201 of the arm 10 of the robot 1, and the positional coordinates of the tip of the tool 30 in the reference coordinate system 201 are calculated based on the detected position and the positional relationship.

Accordingly, the positional coordinates of the tip of the tool 30 in the reference coordinate system 201 are accurately calculated as a result of the operator simply attaching the measurement fixture 50 to the tip portion of the tool 30. This configuration is advantageous in order to achieve both work facilitation and increased precision of work performed by the robot 1.

In addition, in this embodiment, the stationary electrode unit 34, which is the tip portion of the tool 30, extends in the prescribed direction, and the groove 61a, in which the outer circumference surface of the stationary electrode unit 34 fits, is formed in the measurement fixture 50. Accordingly, the controller 20 can accurately recognize the prescribed direction in which the stationary electrode unit 34 extends by detecting the orientation of the measurement fixture 50.

In addition, in this embodiment, the holes 71a pass through the plate member 71, which is the extension portion 70, and openings of the holes 71a that are not measured by the visual sensor 40 are closed by the anti-reflection member 72. Accordingly, the amount of unwanted light coming from inner sides of the holes 71a is reduced when observing the holes 71a of the extension portion 70 by means of the visual sensor 40. This is advantageous in order to accurately detect the individual holes 71a.

In addition, in this embodiment, the extension portion 70 extends in the direction in which the tip portion of the tool 30 extends. Accordingly, it is possible to accurately determine the position of the tip of the tool 30 regardless of the shape of the tip of the tool 30. In addition, in the spot-welding tool 30 as in this embodiment, the stationary electrode unit 34, which is the tip portion of the tool 30, faces the movable electrode unit 33. In this embodiment, the extension portion 70 extends in the direction in which the stationary electrode unit 34 extends so as to be parallel to the stationary electrode unit 34. With this configuration, it is possible to ensure a large enough area in the extension portion 70, and, accordingly, it is possible to accurately determine the position of the tip of the spot-welding tool 30.

Figure 7:
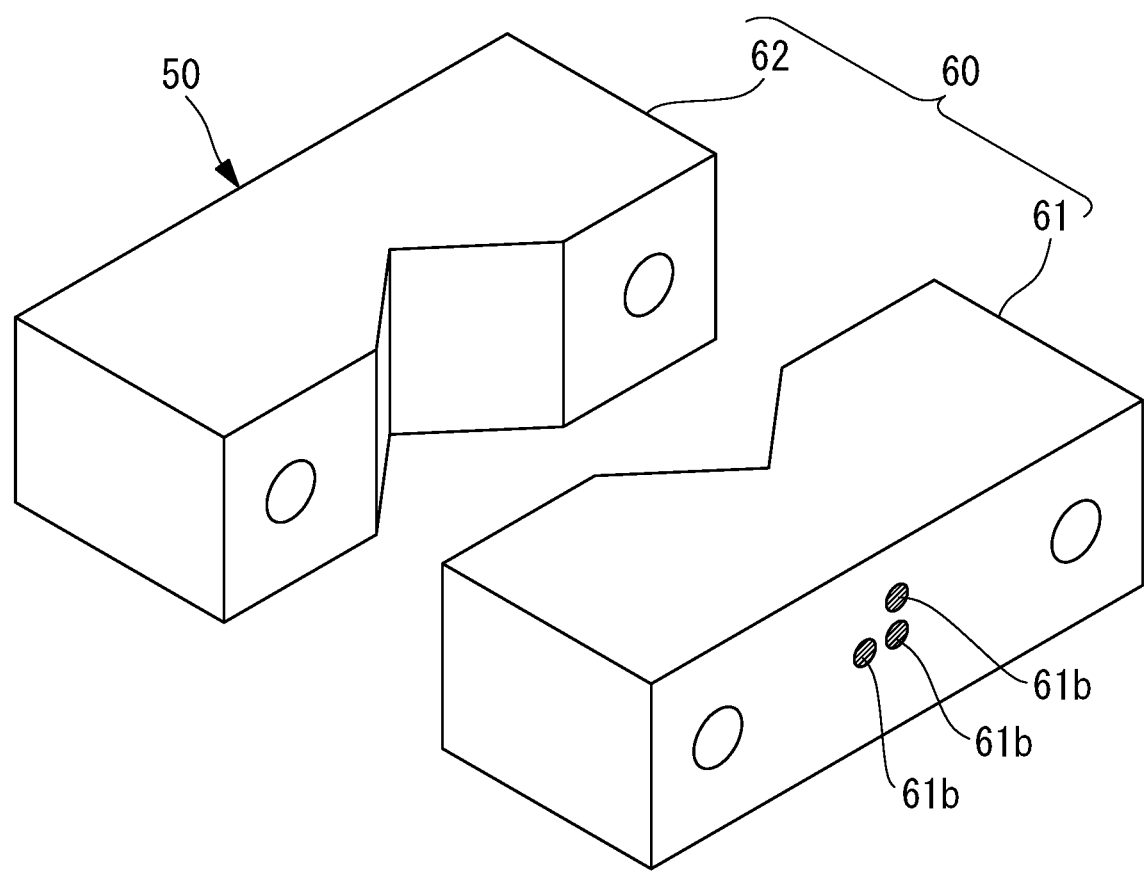
FIG. 7 is a perspective view of a first modification of the measurement fixture of this embodiment.

Note that, in this embodiment, it is also possible to provide marks having circular shapes or other shapes instead of the individual holes 71a. In addition, it is also possible to provide holes having other shapes instead of the plurality of circular holes 71a. In addition, it is also possible to detect, in step S1-5, the position of a feature point of the extension portion 70 or the gripping portion 60 without providing the individual holes 71a. In this case, the distances L1 and L2 with respect to the feature point are input to the input device 24 or the like in step S1-1. In addition, as shown in FIG. 7, it is also possible to provide marks 61b corresponding to the holes 71a in the first gripping member 61 in the gripping portion 60 without providing the extension portion 70.

In addition, in this embodiment, the measurement fixture 50 is attached to the tip portion of the spot-welding tool 30; however, alternatively, the measurement fixture 50 may be attached to a tip portion of an arc-welding tool.

Figure 8:
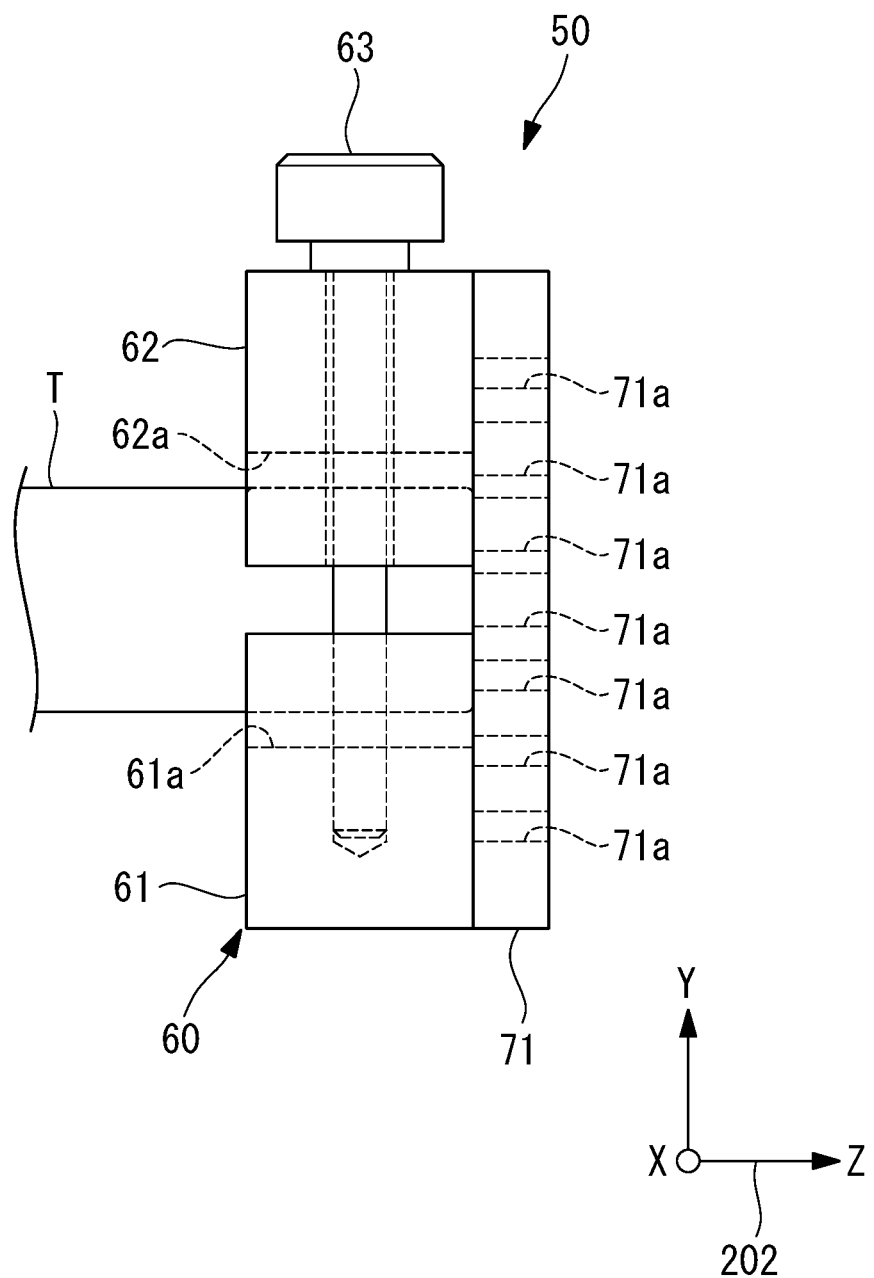
FIG. 8 is a side view of a second modification of the measurement fixture of this embodiment.

In addition, as shown in FIG. 8, for example, when attaching the measurement fixture 50 to a tip portion of a tool T, which is an arc-welding tool, a tool for hammering a pin or the like into a member, a cutting tool, or the like, the plate member 71 may be a plate that extends in a direction orthogonal to the Z-direction of the fixture coordinate system 202. In this case also, the plate member 71 is secured to the first gripping member 61. By disposing the tip portion of the tool T between the first gripping member 61 and the second gripping member 62 and tightening the bolts 63 in the state in which the tip of the tool T is in contact with the plate member 71, the measurement fixture 50 is attached to the tip portion of the tool T. At this time, the position of the tip of the tool T and the position of the Z-direction end surface of the first gripping member 61 are set in the Z-direction.

The invention claimed is:

1. A robot comprising:
   an arm;
   a tool attached to the arm;
   a measurement fixture configured to be detachably attached to a tip portion of the tool; and
   a controller that is configured to
      recognize a reference coordinate system used to control the arm,
      store data indicating a positional relationship between a tip of the tool and the measurement fixture, and
      calculate positional coordinates of the tip of the tool in the reference coordinate system based on position data of the measurement fixture and the positional relationship.

2. The robot according to claim 1, wherein the tip portion of the tool extends in a prescribed direction, the measurement fixture further comprises:
   a gripping portion configured to grip an outer circumference surface of the tip portion of the tool, and
   an extension portion that extends in the prescribed direction from the gripping portion,
   a groove that extends in the prescribed direction, the outer circumference surface of the tip portion is configured to fit in the gripping portion, and the controller is further configured to calculate the positional coordinates of the tip of the tool based on position data of a hole or a mark formed in the extension portion of the measurement fixture and the positional relationship.

3. The robot according to claim 2, wherein the hole passes through the extension portion, has an opening on a side imaged by the visual sensor, and an opening on the opposite side closed by an anti-reflection member.

4. The robot of claim 2, wherein the controller is further configured to recognize distortion in a lens of the visual sensor by using a plurality of holes in the extension portion.

5. The robot of claim 2, wherein a center hole of the extension portion is disposed at a center of an angle of view of the visual sensor.

6. The robot of claim 1, wherein the controller is further configured to recognize both an X-direction and a Z-direction in the reference coordinate system.

7. A measurement fixture configured to be attached to a tip portion of a tool for a robot, the measurement fixture comprising:
   a gripping portion configured to grip an outer circumference surface of the tip portion extending in a prescribed direction; and
   an extension portion that extends in the prescribed direction from the gripping portion, wherein a groove that extends in the prescribed direction, the outer circumference surface of the tip portion is configured to fit and is formed in the gripping portion, and a plurality of holes or marks, configured to be imaged by a visual sensor, are formed in the extension portion, wherein a controller is configured to calculate positional coordinates of the tip of the tool in a reference coordinate system based on the positional relationship.

8. The measurement fixture according to claim 7, wherein a first subset of the plurality of holes are arrayed in an X-direction that is orthogonal to the prescribed direction, and a second subset of the plurality of holes are arranged in the prescribed direction.

9. A tool-tip-position determining method comprising:
   attaching a measurement fixture to a tip portion of a tool attached to an arm of a robot;
   acquiring an image of the measurement fixture by means of a visual sensor whose position is associated with a reference coordinate system used to control the arm;
   storing, in a controller that controls the arm, data indicating a positional relationship between a tip of the tool and the measurement fixture; and
   calculating, by means of the controller, positional coordinates of the tip of the tool in the reference coordinate system based on position data of the measurement fixture and the positional relationship, wherein the position data are calculated based on using acquired image data from the visual sensor.

* * * * *